United States Patent
Bergman, Jr. et al.

[15] 3,694,055
[45] Sept. 26, 1972

[54] THIN FILM, BIAXIALLY BIREFRINGENT NONLINEAR DEVICES

[72] Inventors: John George Bergman, Jr., Morganville; James Hoffman McFee, Colts Neck; Ping King Tien, Chatham Township, all of N.J.

[73] Assignee: Bell Telephone Laboratories, Incorporated, Murray Hill, N.J.

[22] Filed: March 12, 1971

[21] Appl. No.: 123,679

[52] U.S. Cl. .................. 350/157, 307/88.3, 330/4.5, 350/96 WG, 350/147
[51] Int. Cl. .............................................. H03f 7/00
[58] Field of Search .................. 147, 157, 96 WG, 307/88.3; 330/4.5, 4.6, 5

[56] References Cited

UNITED STATES PATENTS 3,387,204   6/1968   Ashkin et al. .................. 330/5
3,537,020   10/1970   Anderson .................. 330/4.5

*Primary Examiner*—David Schonberg
*Assistant Examiner*—Paul R. Miller
*Attorney*—R. J. Guenther and Edwin B. Cave

[57] ABSTRACT

Phase matching for different frequency waves of electromagnetic energy is accomplished within a thin film of nonlinear material in which the index of refraction for a wave polarized orthogonal to the plane of the film is lower than that for a wave to which it is coupled which is polarized parallel to the plane of the film, and in which the index of refraction for waves polarized parallel to the plane of the film differs depending upon beam direction. An exemplary material is polyvinylidene fluoride which is mechanically oriented by biaxial stressing and which is electrically poled.

13 Claims, 2 Drawing Figures

INVENTORS  J.G. BERGMAN JR.
J.H. McFEE
P.K. TIEN

BY George S. Indig
ATTORNEY

3,694,055

THIN FILM, BIAXIALLY BIREFRINGENT NONLINEAR DEVICES

BACKGROUND OF THE INVENTION

1. Field of the Invention

The invention is concerned with nonlinear devices operating within the visible and near-visible spectra. Such devices, which may operate as second-harmonic generators or as any of a variety of parametric devices, as for example downshifters, mixers, etc., depend for efficient operation upon phase matching, i.e., the requirement that successive portions of the generated wave be in phase with each other.

2. Description of the Prior Art

Developments in laser technology during the decade following its first demonstration have placed increasing emphasis on the need for frequency conversion devices. This is in part due to the observations that laser transitions, at least those of the more selective type, are likely to be somewhat limited from the standpoint of wavelength. This limitation has been met, in part, by the development of a variety of nonlinear devices. One of these, the second-harmonic generator, (SHG), halves the wavelength (doubles the frequency) of the laser or pump emission. Other devices may accomplish down-conversion, so parametric devices operating in degenerate or non-degenerate fashion may produce one or two waves of greater wavelength than the pump wavelength. Other frequency conversion devices are known.

A problem common to all such nonlinear devices is that of phase matching. Since real materials are dispersive, that is since velocity is frequency dependent in any such medium, generating and generated energy (different frequency waves) becomes separated in terms of phase during traversal so that energy created by the pump is cyclically constructive and destructive relative to energy already generated.

A now common solution of the problem was first described by J. A. Giordmaine in Vol. 8 *Physical Review Letters*, p. 19 (1962). This solution utilizes bulk refractive indices and capitalizes on the fact that ordinary and extraordinary rays travel at different velocities in a birefringent material. Phase matching may be accomplished in such a material where the birefringence may be made to equal the dispersion, that is, where the difference in velocity of the two different rays is exactly equal to the difference in velocity due to dispersion. Under these circumstances generating and generated waves polarized on ordinary and extraordinary rays may travel at the same velocity. Since materials may not be expected to have precisely the correct value of birefringence for any given pair or triplet of wavelengths to be phase matched, it was necessary to find means for adjusting birefringence.

Where the birefringence is sufficiently high, this may be accomplished in a number of ways. The most obvious is simply to choose a propagation direction within the medium such that the birefringence is less than its maximum, i.e., by approaching an optic axis. A second and more useful approach first set forth in U.S. Pat. No. 3,262,085 utilizes increasing temperature to reduce birefringence to a desired value. Electric field tuning which has a similar effect on a smaller scale may also be utilized as a sort of "vernier" superimposed on temperature tuning.

Another form of phase matching makes use of waveguide principles and utilizes a thin film of nonlinear material. This method requires that the index of a refraction for a wave polarized orthogonal to the film be lower than for a wave polarized parallel to the film and that there be coupling between these waves. While operative in principle, this approach has not been of great practical significance due to the dependence of the phase-matching conditions on the film thickness.

SUMMARY OF THE INVENTION

In accordance with the invention, phase matching of waves of different frequency are accomplished by using the waveguide principle in a thin film of nonlinear material which generally meets the requirements set forth in U.S. Pat. No. 3,586,872 issued June 22, 1971 (application Ser. No. 817,678 filed 4/21/69), i.e., the material is birefringent with the index of refraction at a minimum for a wave polarized orthogonal to the film relative to a coupled wave polarized parallel to the film.

Invention arises from the concept of utilizing a biaxial material which has two indices of refraction for waves traveling in different directions both polarized in the plane of the film, one index greater than and one less than required for phase matching for a given thickness. Providing the coupling requirement is met, i.e., assuming coupling between waves polarized normal to the film and to at least one polarization parallel to the film, precise adjustment is accomplished merely by choosing a direction of propagation such that the phase-matching conditions are satisfied. The precise relationship of the indices of refraction and the thickness requirement are all dependent on the precise nature of the material under consideration. The effective birefringence for two coupled waves traveling in principal directions may be greater than that required providing the index for a wave polarized parallel to the film traveling in another direction within the film is smaller than that of the coupled wave which is polarized within the film. Alternatively, if the wave polarized parallel to the film has too small a birefringence to permit phase matching the phase-matching condition can nevertheless be met providing the index for a different direction for a wave polarized parallel to the film is larger.

The coupling requirement is expressed in terms of a $d_{31}$ or $d_{32}$ coefficient. It is possible also that there be both a $d_{31}$ and $d_{32}$. In any event, it is required only that the effective birefringence offered between the $x$ and $y$ direction-parallel-polarized waves, on the one hand, and the orthogonal waves, on the other, straddle the value of birefringence required for phase matching.

An exemplary material is a biaxially stressed polyvinylidene fluoride. This material depends primarily on C—F bonds for dipole moment although unsubstituted C—H bonds make a contribution. Other materials may utilize carbon-to-fluorine bonds; other halogens bonded to carbons; or may utilize acid groupings, hydroxyl groupings, or nitrate groupings. Such dipole bonds are more generally C—O, C—N or C-Halogen. Such polymeric materials generally constructed on the basis of a carbon chain molecule constitute a preferred class of materials in accordance with the invention. The general requirements are set forth, however, and any materials meeting these requirements are effective for the inventive purpose.

Since thickness continues to play a part and since distortion of the film material, particularly in the case of organic polymeric film material may produce a further adjustment in the indices, such factors are taken into account in describing an inventive embodiment.

An advantage of "waveguide" phase matching is constriction of the beam in the guide (thereby putting a limit on spreading).

DETAILED DESCRIPTION

1. The Figures

Figure 1:
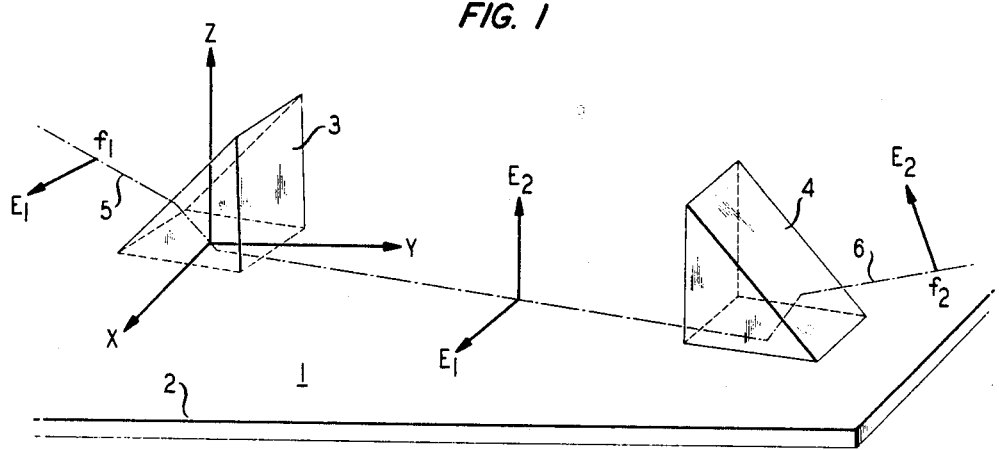
FIG. 1 is a perspective view of a device in accordance with the invention.

Device 1 of FIG. 1 consists of film 2 composed of a nonlinear material in accordance with the invention. Means 3 and 4 are provided for introducing and extracting radiation. Introduced radiation is indicated as arrow 5; extracted radiation as arrow 6. Passage of the radiation within the device is also indicated by arrows. Radiation 5, generally coherent, may be introduced by any suitable device, for example, by a laser. Means not shown may be provided for polarizing the incoming or the outgoing radiation and may also be provided for resonating any one or more of the waves involved. The particular coupling means 3 and 4, depicted, are described in detail in Vol. 14, *Applied Physics Letters*, p. 291 (1969). Other means which may simply consist, for example, of one or more optically polished surfaces, may be provided.

Figure 2:
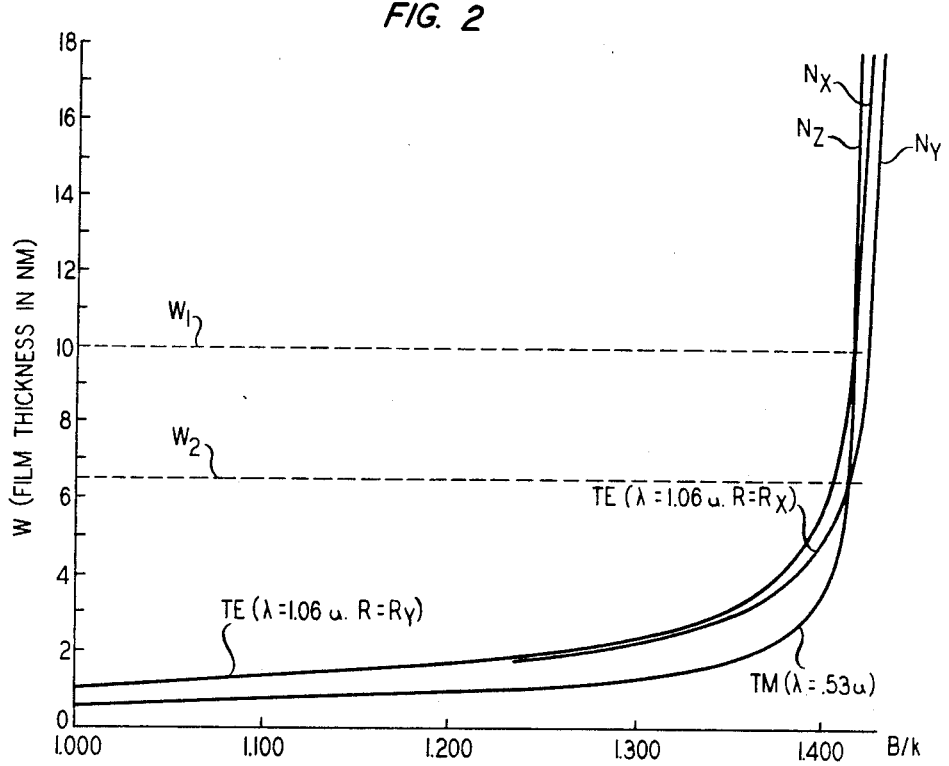
FIG. 2 on coordinates of film thickness and $\beta/k$ shows the relationship between these parameters for an illustrative film.

FIG. 2 is discussed in section 3 of the "Detailed Description."

2. Composition and Preparation

Certain fundamental requirements for materials of the invention have been described. It has been indicated that they must be possessed of net dipole moment. A preferred class which manifests remanent polarization has been described.

It is possible to prescribe preferred substituent groupings on the basis of the fundamental requirements, i.e., substantial dipolar moment. It has been stated that the dipolar strength is dependent upon proper distribution of substituent groupings which are separated from the members of the polymer chain in terms of electronegativity. Materials of this invention are generally carbon-containing, substituent bonding is generally to a carbon atom, and electronegativity is therefore to be measured relative to carbon. Probably the most useful bond is the carbon to fluorine bond, although other substituents such as any of the other halogens, and (or other substituents bonded to a carbon through an oxygen of ester, acid, enol, ketone, etc.) hydroxyl, amide, imide and nitrate groupings are also useful. The requirement of net dipolar moment in turn requires that there not be total cancellation. A material such as a fully fluorinated ethylene polymer, while it contains strongly polar bonds, has no net dipole moment. By contrast, a partially fluorinated polymer of the same class such as trifluoroethylene polymer does have a net dipole moment and does therefore meet that inventive requirement.

The exact nature of the cooperation between dipolar bonds is not known. It may be, for example, that polymeric materials of the nature here concerned do not manifest spontaneous polarization in the manner of inorganic crystalline materials. It may be that materials which show retention of net dipolar moment are dependent not upon the pure energetics of dipole-to-dipole coupling but rather on the rigidity of the molecular system involved.

Regardless of the nature of the responsible mechanism materials found suitable for the practice of the invention are found to be highly crystalline and are properly classified by point-group designations of the four classes corresponding to crystalline symmetries which permit the existence of ferroelectricity and are biaxial. Accordingly, polyvinylidene fluoride is of the point-group designation $C_{2v}$. Other useful representative materials include polyacrylonitrile, polyethyleneterephthalate, polyvinylfluoride, polyvinylchloride and polyvinylidene chloride (all belonging to polar point groups defining biaxial systems, i.e., $C_1$, $C_i$, $C_2$, $C_{2v}$).

A high degree of crystallinity, at least 10 percent on the usual basis as described in (*X-ray Properties of Polymers* by Alexander, Wiley 1969 (Chap. 3)), is certainly desirable. Experimentally, however, it has been determined that suitable samples do show some dipolar relaxation during use so that imposition of a field, even on a material manifesting remanent polarization, may result in some strengthening of response. This behavior is not characteristic of conventional ferroelectric materials and suggests that while crystalline materials of ferroelectric space-groupings may be preferred, suitable behavior may also be obtained in the total absence of ferroelectric coupling. For example use may be made of materials having "frozen-in" dipole moment, i.e., materials ordinarily classified as "electrets."

The fact remains that preferred materials are highly crystalline and do have space designations which permit ferroelectricity. Crystallographic orientation is easily achievable in the usual film sections by biaxial stressing, as for example by blowing into a mold. Poling, either short-term or continuous, requires imposition of a fairly high field ordinarily of the order of at least about 300 K volts per cm. (For the usual film which may have a thickness of about 20 micrometers a field of 600 volts may suffice.) As in conventional ferroelectrics increasing temperature permits reduced poling fields. Initial poling is usually carried out with the material heated to near its melting point (and field is generally maintained as temperature is reduced).

While commercial films produced for example by blowing are suitable for the practice of the invention, alternative procedures may be equally rewarding. Under certain circumstances polymers deposited on metallic surfaces may be possessed of crystallographic orientation, or may conceivably be mechanically worked even as deposited films to yield such orientation. Films so formed, as for example by in situ polarization may, of course, be poled in the same manner as self-supporting films. Counter electrodes may be deposited in any conventional fashion and may or may not be supplemented with radiation-absorbing layers as described.

The general requirement of biaxiality, i.e., that the material of concern possess three different principle indices of refraction with $n_z$ less than $n_x$ or alternatively less than $n_y$, is generally met in the materials described in the foregoing. This permits adjustment of birefringence to a value necessary for some combination of waves and is a necessary requirement of the invention.

Required indices may often be tailored by working (e.g., stretching) the film usually beyond the elastic limit as expedited by heating to temperatures below the melting point. The type and amount of working depends on the history of the film. The general effect of such treatment (proceeding from unworked to biaxially stressed) is to lessen $n_z$ while increasing $n_x$ and $n_y$ (for uniaxial stressing) and finally to increase the spread between $n_x$ and $n_y$ (for biaxial stressing).

As indicated above, it is also a general requirement of the invention that the index for the wave polarized orthogonal to the film, i.e., $n_z$, be lower than that of either $n_x$ or $n_y$ to which that wave is coupled. An important embodiment of the invention arises in large part from the observation that these requirements are easily met in polymeric films of the type discussed above.

The invention is discussed in terms of thin-film devices. By thin film is meant a film of such thickness that the effective index differs substantially from that of the bulk index. To this end, a thin film is defined as one which is a multiple no greater than 50 times that of the longest wavelength energy to be considered in phase matching. This limit is chosen since exceeding it substantially brings the device into the category of bulk refractive index devices, so that the relationships set forth are no longer valid for the major part of the energy of concern.

3. Operation

The nonlinear optical properties of films which satisfy the invention are such that there is a sizable coefficient $d_{32}$ and/or $d_{31}$, i.e., a coefficient of the magnitude of at least $10^{-11}$ esv. Such a coefficient couples a wave of relatively long wavelength propagating in the plane of the film and polarized along a direction intermediate $x$ and $y$ to a wave of relatively short wavelength propagating in the plane of the film and polarized along $z$. In other words, the condition prescribed is that the long wavelength wave be coupled into a TE waveguide mode (E in the plane of the film) with a relatively short wavelength generated as a TM mode (E approximately perpendicular to the plane of the film) with both waves propagating in the same direction. Since $n_x$ is unequal to $n_y$ (the indices of refraction differ for waves traveling in different directions both polarized parallel to the plane of the film), the phase velocity of the TE wave depends upon its direction of propagation in the plane of the film. Providing the effective indices $n_x$ and $n_y$ straddle that required for phase matching with the wave polarized orthogonal to that of the plane of the film, the phase-matching condition can be met. In similar fashion, phase matching can be accomplished for three or more waves of differing wavelength. The nature of the operation may be readily understood by reference to the following discussion which is in terms of an SHG operation utilizing a 1.06 micrometer wavelength fundamental to produce a 0.53 micrometer second harmonic.

Reference is made to FIG. 2 which is a plot on coordinates of film thickness in micrometer units on the ordinate and effective refractive index ($\beta/k$) in dimensionless units relative to vacuum on the abscissa. The particular material for which this information is plotted is a biaxially oriented sample of polyvinylidene fluoride film having a crystallinity of the order of 10 percent as measured by X-ray (see Chap. 3, *X-Ray Properties of Polymers* by Alexander, Wiley (1969)).

The figure shows the functional relationship between effective index of refraction, $\beta/k$, where $\beta$ is the phase constant of the thin film waveguide, and $k$ is defined as $\omega/c$ where $\omega=2\pi f$, where $f$ is frequency, and $c$ is velocity of light in vacuum for the guided wave in the film and the film thickness $w$. Each curve corresponds to a given wavelength, $\lambda$, a mode type (TE or TM), and a mode order $m$. ($m$ is a measure of the thickness of the film in terms of the 1/2 units of the longest wavelength energy of concern as measured in the medium, when $m=0$ thickness is $1/2\lambda$, when $m=1$ thickness is $2\times1/2\lambda$ or $\lambda$, etc.) All the curves in the figure correspond with $m=2$. The curve numbered 10 is the fundamental ($\lambda=1.06$ micrometers), TE mode for propagation in the $y$ direction (E parallel to $x$). It is seen that $\beta/k$ increases from a value of about 1.0 for small values of $w$ to $\beta/k = n_x$ which latter is the bulk index for values of film thickness $w$ appreciably greater than the wavelength $\lambda$ (appreciably greater than about 50 times the longest wavelength $\lambda$, in this case 1.06 micrometers). The middle curve 11 in this figure is also a fundamental ($\lambda=1.06$ micrometers) TE mode but now for propagation in the $x$ direction (E parallel to $y$). This curve coincides with the other TE mode for small $w$, but for this mode, $\lambda/k$ approaches $n_y$ for $w$ appreciably greater than $\lambda$. The bottom curve 12 corresponds to the second harmonic ($\lambda=0.53$ micrometer) TM mode. At the left-end of the plot ($w$ approximately equal to $\lambda$), the second harmonic TM mode corresponds to film thicknesses about one-half as large as those for the fundamental modes. As $w$ becomes appreciably greater than $\lambda$, the effective index for the TM mode approaches the bulk index $n_z$. In polyvinylidene fluoride film, $n_z$ (0.53 micrometers) is less than either $n_x$ (1.06 micrometers) or $n_y$ (1.06 micrometers); the second harmonic TM mode curve intersects the two fundamental TE mode curves as shown in the figure. These intersections correspond to phase matching. The intersection at $w=w_1$ indicates the film thickness required for phase matching with the fundamental propagating in the $y$ direction, and the intersection at $w=w_2$ indicates the film thickness for phase matching with a fundamental wave propagating along the $x$ direction. For the example plotted, $w_1$ equals 10 micrometers and $w_2$ equals 6.5 micrometers. Therefore, for any particular film thickness between these two limits, phase matching is achievable under the conditions set forth by choosing the appropriate direction of propagation for the fundamental wave in the plane of the film. For the example plotted, since $d_{32}$ is small and only the $d_{31}$ coupling is substantial, primarily the $x$ component of the wave polarized parallel to the plane of the film is coupled. For any angle $\theta$ in the plane of the film relative to the $y$ axis, the effective nonlinear coefficient is $d_{31} \cos^2\theta$. Thus, for this situation, the nonlinear coupling is fully effective only for $\theta=0$ and decreases to near zero at $\theta=90°$. In this situation, the full range of $w_1$ to $w_2$ is not usable because of the low coupling at $w=w_2$. Nevertheless, considerable tuning range of $\theta$ is available because coupling decreases relatively gradually as $\theta$ increases.

EXAMPLE

A film of polyvinylidene fluoride of a thickness of 9 micrometers is used in the apparatus depicted in FIG. 1. The output of an Nd—YAG laser at 1.06 micrometers plane polarized orthogonal to the film is introduced into the film and the film is rotated until maximum emission of 0.53 micrometer is extracted. Maximum output, realized at an angle $\theta$ to the $y$ axis of about 30°, indicates the birefringence phase-matching requirement is met for that rotation.

The example deals with a second-harmonic generating situation, one in which there are only two wavelengths of concern. The general requirement is, of course, also met for the degenerate parametric down-conversion case in which the pump or higher frequency wave is polarized orthogonal to the film. Three-frequency phase matching is accomplished by satisfying the relationship $\beta_3=\beta_1+\beta_2$, where $\beta_3$ is the phase constant of the thin film waveguide for the pump wave and where $\beta_1$ and $\beta_2$ are the constants of corresponding nature for the idler and signal waves. As in all other devices of the invention, it is required again that the highest frequency wave, in this instance the pump wave 3, be polarized orthogonal to the plane of the film.

What is claimed is:

1. Phase-matchable, thin film, nonlinear device for operation within a wavelength range including the optical spectrum and extending into the infrared spectrum, said device comprising a thin film of nonlinear material, said film having an index of refraction for a first wave polarized orthogonal to the plane of the film which is smaller than that of a second wave polarized parallel to the plane of the film to which the said first wave may be electrically coupled, said film being of a maximum thickness 50 times that of the longest wavelength energy to be phase matched, together with means for introducing wave energy into and means for extracting wave energy from said thin film, whereby at least one energy component of a wavelength not included in the introduced wave energy is generated within the thin film, said component being generated substantially in phase with itself during traversal, characterized in that said thin film is of such nature that the index of refraction for a wave polarized parallel to the plane of the film differs depending upon beam direction.

2. Device of claim 1 in which said thin film consists essentially of a polymeric material having a coupling coefficient of at least $10^{-11}$ esv between said first and second waves.

3. Device of claim 2 in which said polymeric material is essentially a substituted hydrocarbon.

4. Device of claim 3 in which said substituted hydrocarbon contains substituents selected from the group consisting of fluorine, bromine, chlorine, iodine, nitrate, hydroxyl, and acid.

5. Device of claim 4 in which the said substituted hydrocarbon has a crystallinity of at least 10 percent and in which the crystalline portion belongs to a polar-point group defining a symmetry in which three crystallographic axes are of different lengths.

6. Device of claim 5 in which the said substituted hydrocarbon is selected from the group consisting essentially of polyvinylidene fluoride, polyacrylonitrile, polyethyleneterephthalate, polyvinylfluoride, polyvinylchloride, and polyvinylidene chloride.

7. Device of claim 6 in which the said substituted hydrocarbon consists essentially of polyvinylidene fluoride.

8. Device of claim 1 in which at least one of said means includes a coupling prism.

9. Device of claim 8 in which each of said means includes a coupling prism.

10. Device of claim 1 in which said first and second means are so arranged as to provide for a propagation direction for the first and second waves such that they are effectively phase matched.

11. Device of claim 10 in which the said propagation direction is intermediate that of two crystallographic directions within the film.

12. Device of claim 9 adapted for second harmonic generation in which the means for introducing wave energy provides for introduction of the said second wave and in which the means for extracting wave energy includes means for extracting the said first wave.

13. Device of claim 9 adapted for downshifting parametric operation in which the means for introducing wave energy provides for introduction of the said first wave and in which the means for extracting wave energy includes means for extracting the said second wave.

* * * * *